US009058175B2

(12) United States Patent
Dalal et al.

(10) Patent No.: US 9,058,175 B2
(45) Date of Patent: Jun. 16, 2015

(54) PARAMETER PROMOTION IN A BLOCK DIAGRAM MODELING ENVIRONMENT

(75) Inventors: Yogesh Kamalkishore Dalal, Bangalore (IN); Sanjai Singh, Bangalore (IN); Saikiran S. Thunuguntla, Bangalore (IN); John Edward Ciolfi, Wellesley, MA (US)

(73) Assignee: The MathWorks, Inc., Natick, MA (US)

(*) Notice: Subject to any disclaimer, the term of this patent is extended or adjusted under 35 U.S.C. 154(b) by 339 days.

(21) Appl. No.: 13/459,281

(22) Filed: Apr. 30, 2012

(65) Prior Publication Data

US 2012/0316851 A1 Dec. 13, 2012

Related U.S. Application Data

(60) Provisional application No. 61/494,213, filed on Jun. 7, 2011.

(51) Int. Cl.
*G06F 17/50* (2006.01)
*G06F 9/44* (2006.01)
*H04N 1/00* (2006.01)

(52) U.S. Cl.
CPC ........................................ *G06F 8/34* (2013.01)

(58) Field of Classification Search
USPC .......................................... 703/2, 13, 22, 24
See application file for complete search history.

(56) References Cited

U.S. PATENT DOCUMENTS

| 5,801,942 | A  | * | 9/1998 | Nixon et al. ..................... 700/83 |
| 7,344,883 | B2 | * | 3/2008 | Vogels et al. ................. 435/325 |
| 7,546,602 | B2 | * | 6/2009 | Hejlsberg et al. ............. 719/313 |
| 7,934,194 | B2 |   | 4/2011 | Kinnucan, Jr. et al. |
| 2003/0016246 | A1 |   | 1/2003 | Singh |
| 2003/0060913 | A1 | * | 3/2003 | Turner et al. .................. 700/103 |
| 2006/0009942 | A1 | * | 1/2006 | Keck et al. .................... 702/122 |
| 2006/0009943 | A1 | * | 1/2006 | Keck et al. .................... 702/122 |
| 2006/0010416 | A1 | * | 1/2006 | Keck et al. ...................... 716/19 |
| 2006/0053374 | A1 | * | 3/2006 | Wilensky ...................... 715/716 |
| 2008/0033710 | A1 | * | 2/2008 | Turner et al. .................... 703/27 |
| 2008/0092111 | A1 |   | 4/2008 | Kinnucan et al. |
| 2008/0177994 | A1 | * | 7/2008 | Mayer .............................. 713/2 |

OTHER PUBLICATIONS

Kinnucan et al., "A Graphical Approach to Object-Oriented Modeling of Dynamic Systems", Summer Computer Simulation Conference, 2007, pp. 513-521.
Co-pending U.S. Appl. No. 13/835,918 entitled "Overriding an Interface in a Graphical Block Diagram Modeling Environment" by Dalal et al., filed Mar. 15, 2013, 53 pages.

* cited by examiner

*Primary Examiner* — Thai Phan
(74) *Attorney, Agent, or Firm* — Harrity & Harrity, LLP

(57) ABSTRACT

A computational device receives, from a user, a selection of a block, a subsystem or multiple blocks from a block diagram modeling environment, and presents, to the user, a set of parameters associated with the block, subsystem, or multiple blocks. The computational device receives, from the user, selection of a first subset of parameters from the set of parameters, and creates a customized dialog box by promoting the selected first subset of parameters to the customized dialog box, wherein the customized dialog box permits editing of values associated only with the first subset of parameters.

28 Claims, 15 Drawing Sheets

PARAMETER PROMOTION IN A BLOCK DIAGRAM MODELING ENVIRONMENT

CROSS REFERENCE TO RELATED APPLICATION

This application claims priority from provisional application No. 61/494,213, filed Jun. 7, 2011, the disclosure of which is incorporated by reference herein in its entirety.

BACKGROUND

Simulink™ from The MathWorks, Inc. of Natick, Mass., is an example of a graphical modeling environment, specifically a block diagram environment. Simulink™ allows users to create a pictorial model of a dynamic system. Models generated in Simulink™ consist of a set of symbols, called blocks. Each block can have zero or more input ports, output ports, and states. Each block represents a dynamic system whose inputs, states, and outputs can change continuously and/or discretely at specific points in time. Since each block is a dynamic system, it is represented by a set of equations. The lines are used to connect the blocks' ports to one another, and represent time-varying quantities used by the block's equations.

A block is referred to as 'atomic' if its functional definition is outside the context of the model in which it is placed. Simulink™ has a set of predefined atomic blocks (e.g. Sum, Product, Gain), and the user can also create their own atomic blocks through user-written 'S-functions'. Being atomic, S-functions' functional definitions are specified outside the context of the model, for example using C code or MATLAB 'm' code. A 'composite' block is a block whose functional definition is specified through the model, using sets of atomic and composite blocks. Simulink™ permits the user to specify 'subsystems', composite blocks whose definition consists of interconnected sets of predefined blocks, user-written S-functions, and other Simulink™ subsystems. Subsystems can be nested hierarchically, defining a 'model hierarchy.'

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1A:
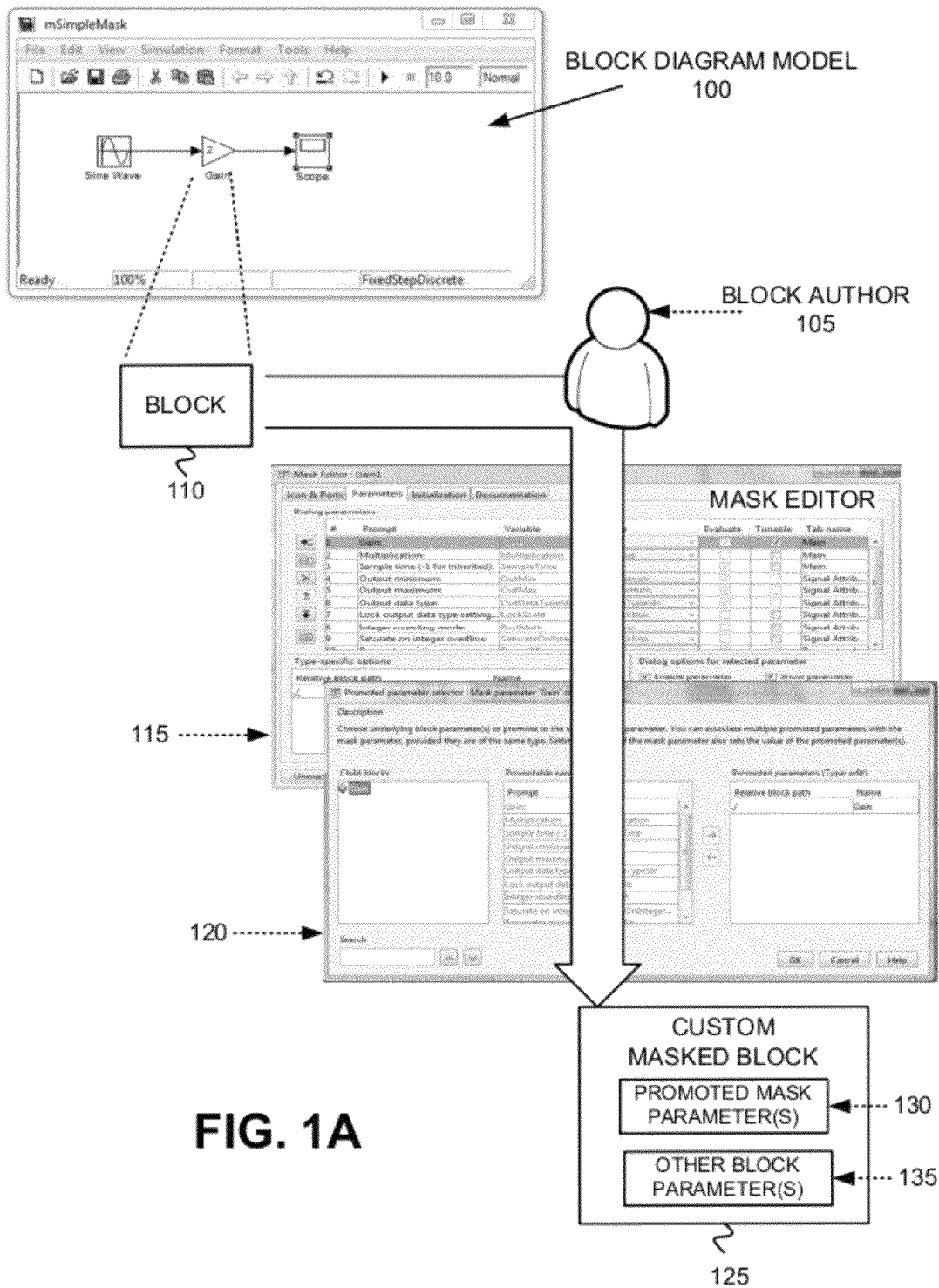
FIGS. 1A and 1B are diagrams that depict an exemplary overview of the promotion of parameters of a block to generate a custom masked block and an associated custom mask dialog.

The following detailed description refers to the accompanying drawings. The same reference numbers in different drawings may identify the same or similar elements. Also, the following detailed description does not limit the invention.

Block diagram models, consisting of one or more blocks, are utilized in a variety of modeling paradigms and application contexts in engineering and science. A block can include elements from which models can be built and contains fields, called block parameters, which can be used to enter values that customize the behavior of the block. In modeling paradigms, reusable components for design can be packaged in groups (e.g., groups of blocks) and provided to build more complex systems. A subsystem block can include a set of blocks that have been replaced by a single block called a subsystem block. As a model increases in size and complexity, the model can be simplified by grouping blocks into subsystems. Often, component designers abstract out the complexity of such complex systems from the end-user by providing a simplified external interface.

In doing so, component designers need a mechanism to ensure that certain artifacts of these reusable components can be abstracted out and be controlled by an external interface. Also, in certain cases, component designers may feel the need to fix or limit some of the options available in the complex systems, thereby preventing such options from being visible to, or selectable by, the end-user. This allows component designers to enforce pre-configured sets of rules. Traditionally, the designs to achieve this desired behavior and flexibility, suffer from drawbacks in syntactic clarity, run-time performance, added complexity and poor error checking, resulting in a loosely integrated system.

A complex system communicates with different reusable components packaged inside the complex system using parameters controlling those reusable components. This can require the ability to control multiple parameters from multiple reusable components at different levels (e.g., hierarchical levels) inside of a complex system using a single point of control. It may also require the ability to choose and move parameters that are modifiable by the end-user in the system hierarchy.

Exemplary embodiments described herein overcome these and possibly other drawbacks of conventional approaches and allow component and system designers to build interfaces to those systems with a finer, flexible, syntactically better and automated approach.

While building complex systems, component designers often abstract out the complexity of these systems by providing a simplified external interface. Masking may be used to provide such a custom user interface. A mask can be a customer user interface (e.g., a dialog) for a block (e.g., a Simulink block). The mask hides the native user interface of the underlying block, substituting an icon and a parameters dialog box defined by the mask. Using masks, the component designer can provide interface customization, logic encapsulation, and data hiding or obfuscation. The component designer can specify mask parameters which can provide an external user interface allowing users to communicate with different reusable components wrapped under the mask.

Parameter promotion can introduce a new mask parameter type referred to as promote, which component designers can use to promote parameters from different levels inside of a complex system to that mask parameter. This mask parameter in turn controls the parameters associated with it. Setting the value of the mask parameter also sets the value of all the associated promoted parameters.

The mask parameter of promote type itself can be promoted thereby allowing building a complex nested chain of promoted parameters. This provides greater flexibility to the component designer while assimilating different reusable components to build a complex system. Once the parameter is promoted, any direct edit of the parameter's value may be disallowed. The parameter may, in some implementations, only be set via the mask parameter to which this parameter is promoted.

The mask parameter of promote type also inherits various key properties from the associated promoted parameters. This helps the component designer in building a highly integrated interface. It also ensures that if some of these properties of the promoted parameters are changed in the future version the mask parameter will inherit them providing auto-update functionality with minimal to no overhead on the part of the component designer.

The mask editor may be the user interface that allows the component designer to define the mask. Using the mask editor, the component designer may be presented with a tree view of all the valid blocks inside the components whose parameters can be promoted. Each of these blocks may show all of the valid parameters which the component designer can choose to promote. The component designer can decide to promote multiple parameters to a single mask parameter provided they satisfy all the rules for multiple parameters to be promoted together. Appropriate error checking is done to ensure that only valid parameters can be coupled together thereby ensuring the sanity of the external interface.

Overview

Figure 1B:
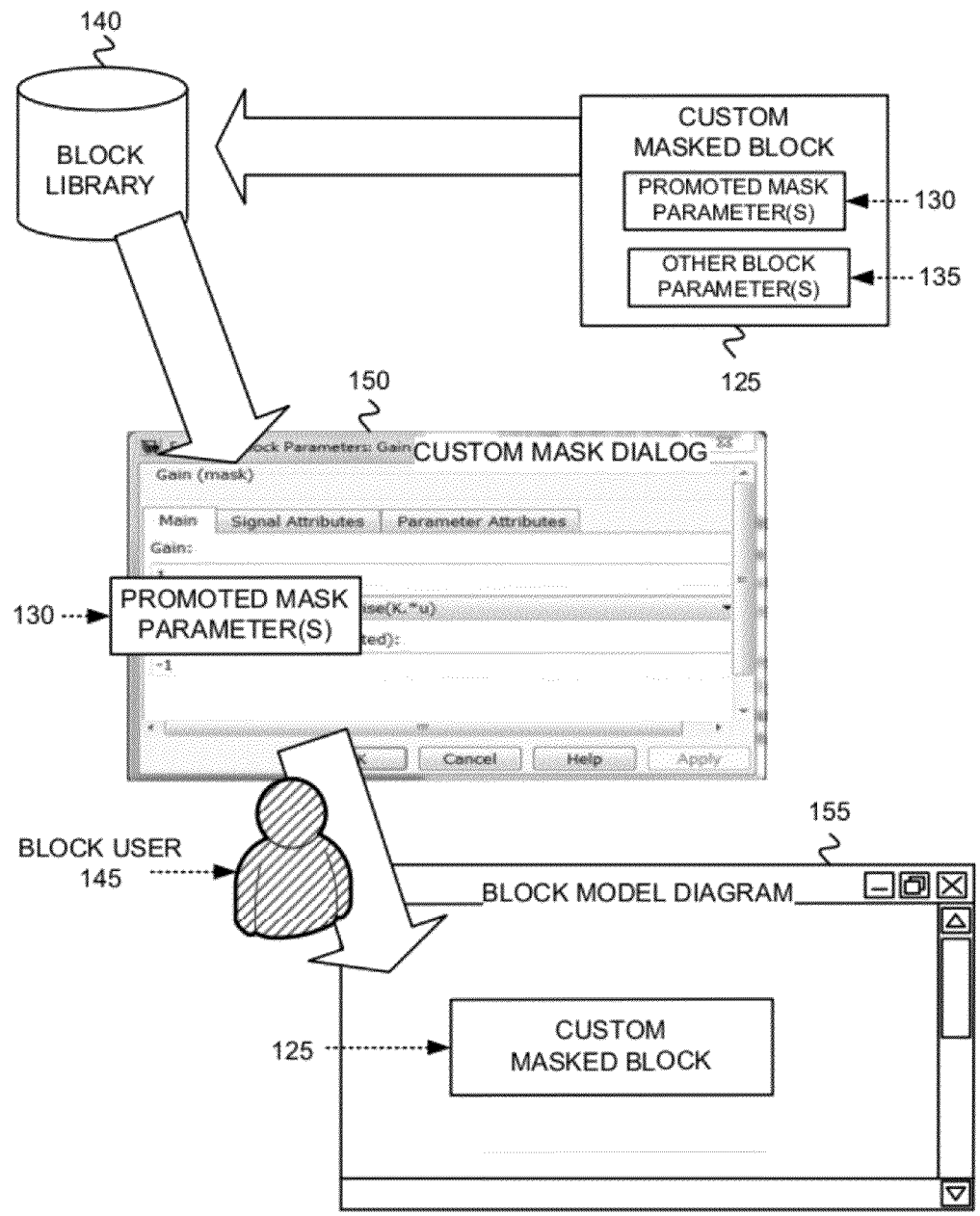

FIGS. 1A and 1B illustrate an overview of the promotion of parameters of a block to generate a custom masked block and an associated custom mask dialog. As shown in FIG. 1A, a block diagram model 100 may include multiple blocks (sine wave, Gain, and Scope shown as an example), and a block author 105 (e.g., a library block author) may select a block 110 from model 100 for parameter promotion and the generation of a custom masked block (Gain block shown being selected in FIG. 1A).

Block author 105 may use a mask editor dialog 115 and a promoted parameter selector dialog 120 to promote a set of selected mask parameters 130, from built-in block parameters, to a custom masked block 125. A built-in block, and its corresponding built-in parameters represent a standardized block and its associated parameters that were previously created and stored in memory for use in modeling a system or subsystem. The promoted set of mask parameters 130 represent a portion (e.g., a subset) of the built-in parameters from the original block that may be editable by an eventual block user when creating a customized masked block that can be used in a block model diagram. Thus, promoting a built-in parameter for a block to a mask parameter includes block author 105 selecting what block specific parameters of custom masked block 125 may be editable by an eventual block user when customizing the masked block 125 for use in a block model diagram. In some implementations, block author 105 may add custom information to custom masked block 125 (e.g., company notes, custom parameters, etc.). Custom masked block 125 may further include other block parameters 135 that were not promoted to custom masked block 125 (i.e., other built-in block parameters of block 110).

As shown in FIG. 1B, custom masked block 125 may be subsequently stored in a block library 140 for future retrieval and use by a block user 145. Block user 145 may retrieve custom masked block 125 from block library 140 via a custom mask dialog 150 that may present the promoted mask parameters 130 (i.e., the specific promoted block parameters that may be edited) to block user 145 for editing their values. Custom masked block 125, with promoted and/or edited mask parameters, may be used by block user 145 in a block model diagram 155 to model a system or subsystem. Custom mask dialog 150 may be realized as a non-modal or modal window separate from other windows, or it can be a region of an existing window, or other graphical interface.

Promotion of block parameters to a mask can provide the block author (e.g., block author 105) the ability to choose a valid parameter from any block and move it up in the model hierarchy. Promotion of block parameters to a mask further gives the block author the ability to control multiple parameters at any level in the model hierarchy via a single parameter and to lock down a parameter that the block author does not want to expose to block users. Promotion of block parameters to a mask further allows the building of a nested chain of promoted parameters inside complex system models.

The block user 145 can configure the custom block 125 using the custom mask dialog 150 or the block user 145 can configure the custom block parameters defined using a textual (programmatic) Application Programming Interface (API) (not shown) which lets block user 145 programmatically set the promoted parameters 130 and, possibly, additional (other) parameters (e.g., other block parameters 135) using an API which accepts the parameter names and values. An example API using the MATLAB programming language would be:

set_param('argument 1','argument 2','argument 3')

where the first argument for setparam may either be a string or handle to the custom masked block 125, the second argument may be the name of the promoted mask parameter 130 or the additional other parameter(s), and the third argument may be the value for the parameter.

Promotion of parameters simplifies the construction of new blocks from existing blocks by re-using existing parameter elements. Prior to the invention of promoted parameters, development of a custom block dialog required creating a new parameter and associating it with an existing parameter. Having to create new parameters and form the association takes more steps and is error prone. For example, when creating new parameters and associating them with existing parameters, it is very easy to make mistakes where the properties of the new parameter are not identical to the associated parameter. The use of promoted parameters both simplifies the creation of new custom block dialogs and eliminates common failure modes.

Exemplary Network Environment

Figure 2:
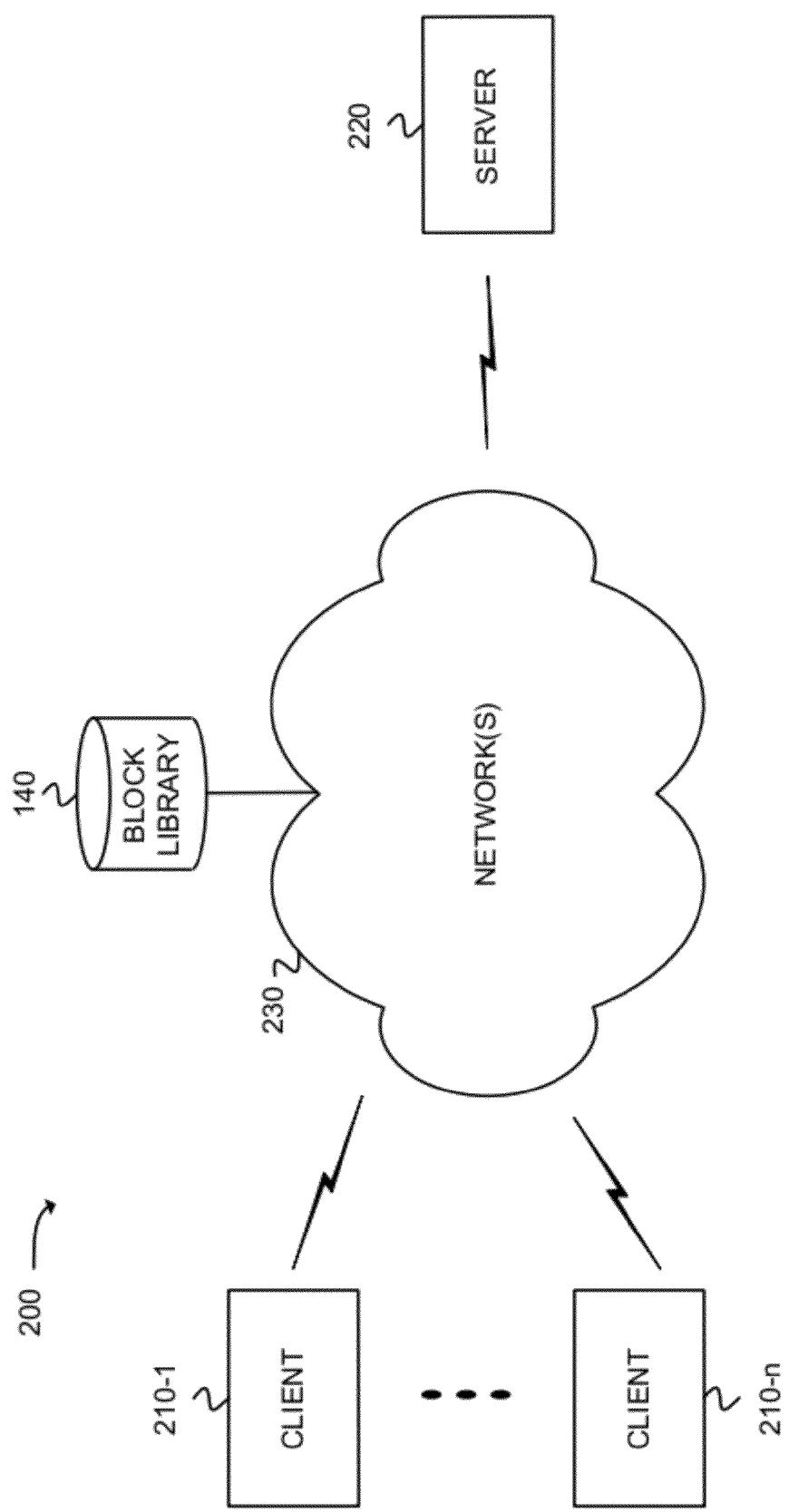
FIG. 2 is an exemplary network environment in which block parameters may be promoted to generate custom masked blocks.

FIG. 2 is an exemplary network environment 200 in which block parameters may be promoted to generate custom masked blocks. Network environment 200 may include one or more clients 210-1 through 210-n that may connect to a server 220 via one or more network(s) 230. Network environment 200 may additionally include block library 140, shown in FIGS. 1A and 1B, as a separate network entity from clients 210-1 through 210-n and server 220. However, in some implementations, block library 140 may be integral to clients 210-1 through 210-n and/or server 220. Multiple clients 210 and one server 220 have been illustrated as connected to network(s) 230 for simplicity. In practice, there may be more or fewer clients and servers. Also, in some instances, a client may perform one or more functions of a server and a server may perform one or more functions of a client.

Clients 210-1 through 210-n may include devices, such as a computer (e.g., desktop, laptop, palmtop or tablet computer), a wireless telephone, a personal digital assistant (PDA), a lap top, or another type of computation or communication device, a thread or process running on one of these devices, and/or an object executable by one of these devices. Block author 105 may use, for example, server 220 to generate one or more custom masked blocks for storage in block library 140. Block users (not shown in FIG. 2) may further use respective clients 210-1 through 210-n for retrieving the generated custom masked blocks from block library 140 and using the custom masked blocks in block diagram models for modeling systems or subsystems.

Server 220 may include one or more devices capable of executing instructions to perform an operation. Server 220 may include, for example, a computer, a wireless device, a lap top, or another type of computation or communication device, a thread or process running on one of these devices, and/or an object executable by one of these devices.

Network(s) 230 may include one or more networks of any type, including a local area network (LAN); a wide area network (WAN); a metropolitan area network (MAN); a satellite network; a telephone network, such as the Public Switched Telephone Network (PSTN) or a Public Land Mobile Network (PLMN); an intranet, the Internet; or a combination of networks. The PLMN(s) may further include a packet-switched sub-network, such as, for example, General Packet Radio Service (GPRS), Cellular Digital Packet Data (CDPD), or Mobile IP sub-network.

Exemplary Client/Server Architecture

Figure 3:
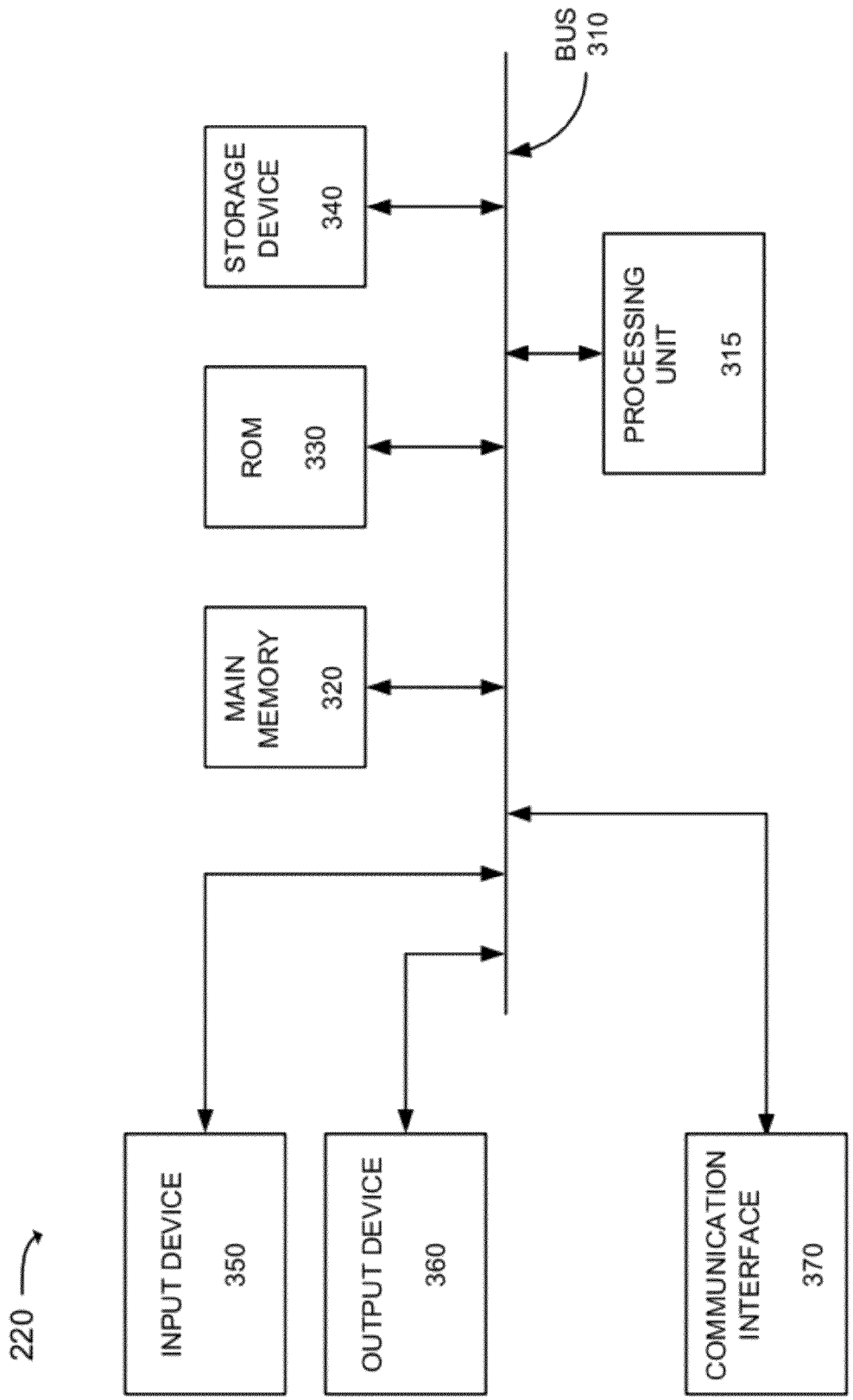
FIG. 3 is a diagram of exemplary components of a server or client of FIG. 2.

FIG. 3 is a diagram of exemplary components of server 220. Clients 210-1 through 210-n may be similarly configured. Server 220 may include a bus 310, a processing unit 315, a main memory 320, a read only memory (ROM) 330, a storage device 340, an input device 350, an output device 360, and a communication interface 370. Bus 310 may include a path that permits communication among the elements of server 220.

Processing unit 315 may include one or more processors or microprocessors, or processing logic that may interpret and execute instructions. Main memory 320 may include a random access memory (RAM) or another type of dynamic storage device that may store information and instructions for execution by processing unit 315. ROM 330 may include a ROM device or another type of static storage device that may store static information and instructions for use by processing unit 315. Storage device 340 may include a magnetic and/or optical recording medium and its corresponding drive.

Input device 350 may include a mechanism that permits an operator (e.g., block author 105) to input information to server 220, such as a keyboard, a mouse, a pen, voice recognition and/or biometric mechanisms, etc. Output device 360 may include a mechanism that outputs information to the operator, including a display, a printer, a speaker, etc. Communication interface 370 may include any transceiver that enables server 220 to communicate with other devices and/or systems. For example, communication interface 370 may include mechanisms for communicating with another device or system via a network, such as network(s) 230.

Server 220, consistent with the embodiments described herein, may perform certain operations or processes, as will be described below. Server 220 may perform these operations in response to processing unit 315 executing software instructions contained in a computer-readable medium, such as memory 320. A computer-readable medium may be defined as a physical or logical memory device.

The software instructions may be read into memory 320 from another computer-readable medium, such as data storage device 340, or from another device via communication interface 370. The software instructions contained in memory 320 may cause processing unit 315 to perform operations or processes that will be described later. Alternatively, hard-wired circuitry may be used in place of or in combination with software instructions to implement embodiments described herein. Thus, implementations described herein are not limited to any specific combination of hardware circuitry and software.

Exemplary Server Functional Diagram

Figure 4:
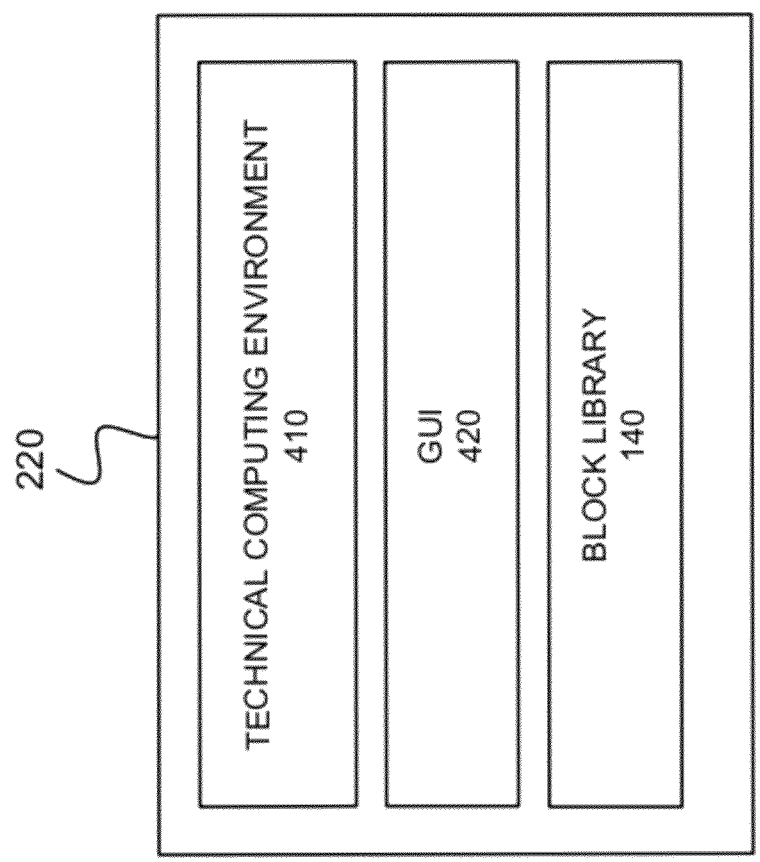
FIG. 4 is an exemplary functional diagram of the server of FIG. 2.

FIG. 4 is an exemplary functional diagram of server 220. The diagram of FIG. 4 depicts functional components that may be implemented by processing unit 315, or in the case of data, implemented in memory 320, ROM 330 or storage device 340. As depicted in FIG. 4, at a functional level, server 220 may include a technical computing environment (TCE) 410, a graphical user interface (GUI) 420, and block library 140.

TCE 410 may include any hardware and/or software based logic that provides a computing environment that allows users to perform tasks related to disciplines, such as, but not limited to, mathematics, science, engineering, medicine, business, etc. In one implementation, TCE 410 may include a dynamically-typed programming language (e.g., the M language) that can be used to express problems and/or solutions in mathematical notations. For example, one or more languages provided in TCE 410 may use an array as a basic element, where the array may not require dimensioning. TCE 410 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 410 may further provide mathematical functions and/or graphical tools (e.g., for creating plots, surfaces, images, volumetric representations, etc.). In one implementation, TCE 410 may provide these functions and/or tools using toolboxes (e.g., toolboxes for signal processing, image processing, data plotting, parallel programming, etc.). In another implementation, TCE 410 may provide these functions as block sets. In still another implementation, TCE 410 may provide these functions in another way, such as via a library, etc.

TCE 410 may be implemented as a text-based environment (e.g., the MATLAB® programming language from "The MathWorks"); Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; Ptolemy from the University of California at Berkeley; etc.), a graphically-based environment (e.g., Simulink®, Stateflow®, SimEvents™, etc., by The MathWorks, Inc.; VisSim by Visual Solutions; LabViewt by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; aspects of a Unified Modeling Language (UML) or SysML environment; etc.), or another type of environment, such as a hybrid environment that includes one or more of the above-referenced text-based environments and one or more of the above-referenced graphically-based environments.

GUI 420 may include any type of graphical interface that may receive user input for generating and/or using custom masked blocks. GUI 420 may present mask editor dialogs, promoted parameter selector dialogs, and custom mask dialogs. Block library 140 may include a library of blocks, including built-in blocks and custom masked blocks, and their associated parameters. Block library 140 may be accessed to retrieve built-in blocks or custom masked blocks.

Client 210 may, in some implementations, include the same or similar functional components as those shown in FIG. 4. In some implementations, server 220 or client 210 may include fewer, different or additional functional components than those depicted in FIG. 4.

Exemplary Block Parameter Promotion Process

Figure 5:
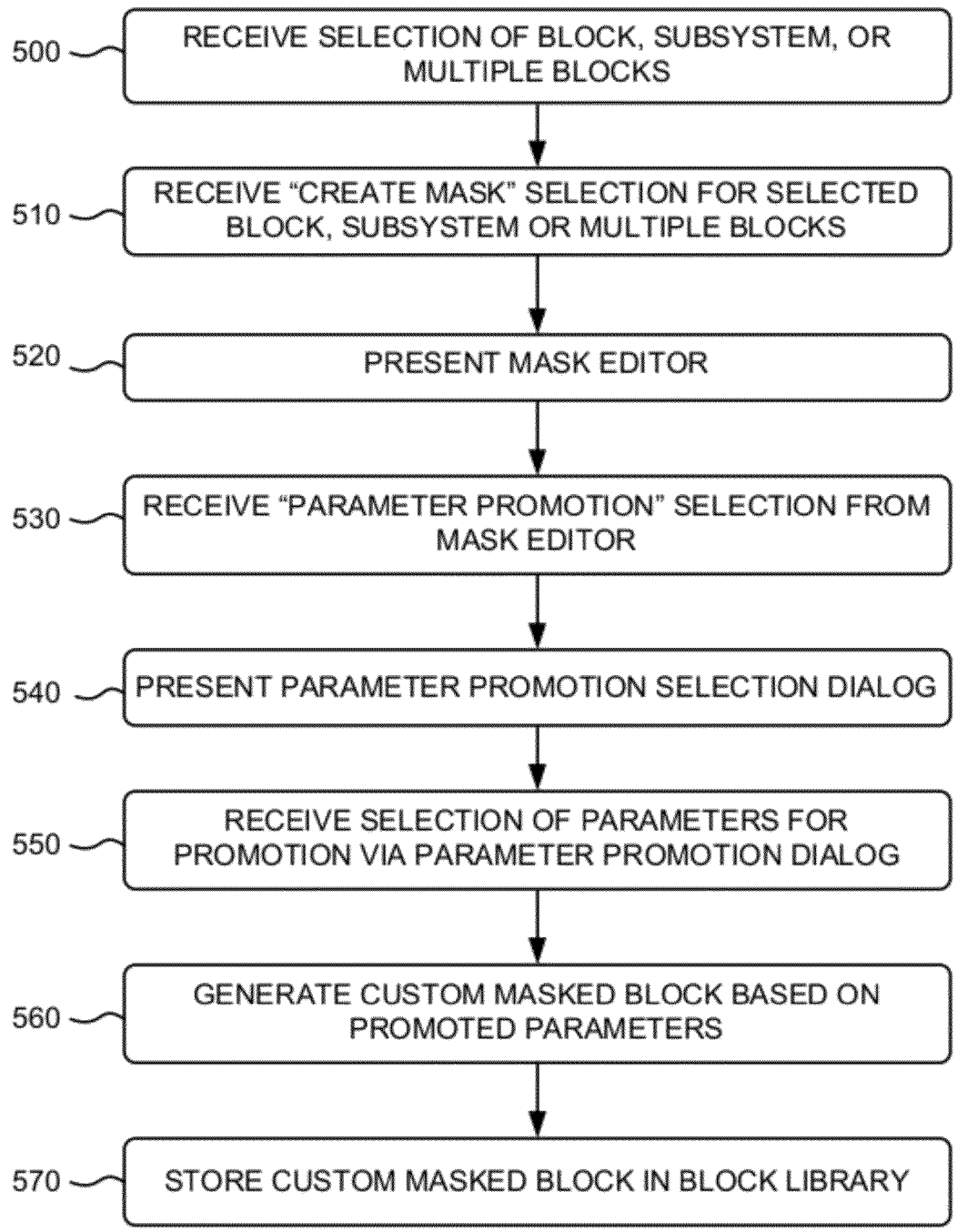
FIG. 5 is a flowchart of an exemplary process for promoting parameters for a block, subsystem or multiple blocks for generating a custom masked block.

FIG. 5 is a flowchart of an exemplary process for promoting parameters for a block, subsystem or multiple blocks, for generating a custom masked block. In one implementation, the process exemplified by FIG. 5 may be implemented by processing unit 315 of server 220. In another implementation, the process exemplified by FIG. 5 may be implemented by processing unit 315 of client 210.

The exemplary process may include receiving selection of a block, subsystem or multiple blocks from a block diagram modeling environment (block 500). Block author 105 may select either a single block, a subsystem (i.e., comprising multiple blocks arranged in a single subsystem), or multiple blocks (e.g., multiple related or interconnected blocks). As models grow in size and complexity, the component designer can simplify the model by grouping blocks into subsystems. A subsystem may include a set of underlying blocks that has been graphically replaced by a single block called a subsystem block. A subsystem block reduces the number of blocks displayed in a block diagram window and enables the component designer to establish a hierarchical block diagram, where the subsystem block is in one layer of the block diagram, and child blocks that make up the subsystem are in another layer of the subsystem block. In some embodiments, a subsystem can include two or more layers of child blocks arranged in hierarchies within the subsystem. To abstract the complexity of child blocks of a subsystem block, the component designer may create a mask to the subsystem which acts as a user interface that allows block users to communicate with child blocks. The component designer may promote necessary child block parameters to the subsystem mask, including promoting multiple child block parameters to a single mask that can control the multiple child block parameters.

Large models may contain thousands of blocks, and the component designer may promote parameters from multiple blocks within the model that may not be in a subsystem. The multiple blocks may be in a same hierarchy, and a multi-block mask may be created that promotes block parameters of selected blocks to the mask. Setting the mask may automatically set the block parameters.

Figure 6:
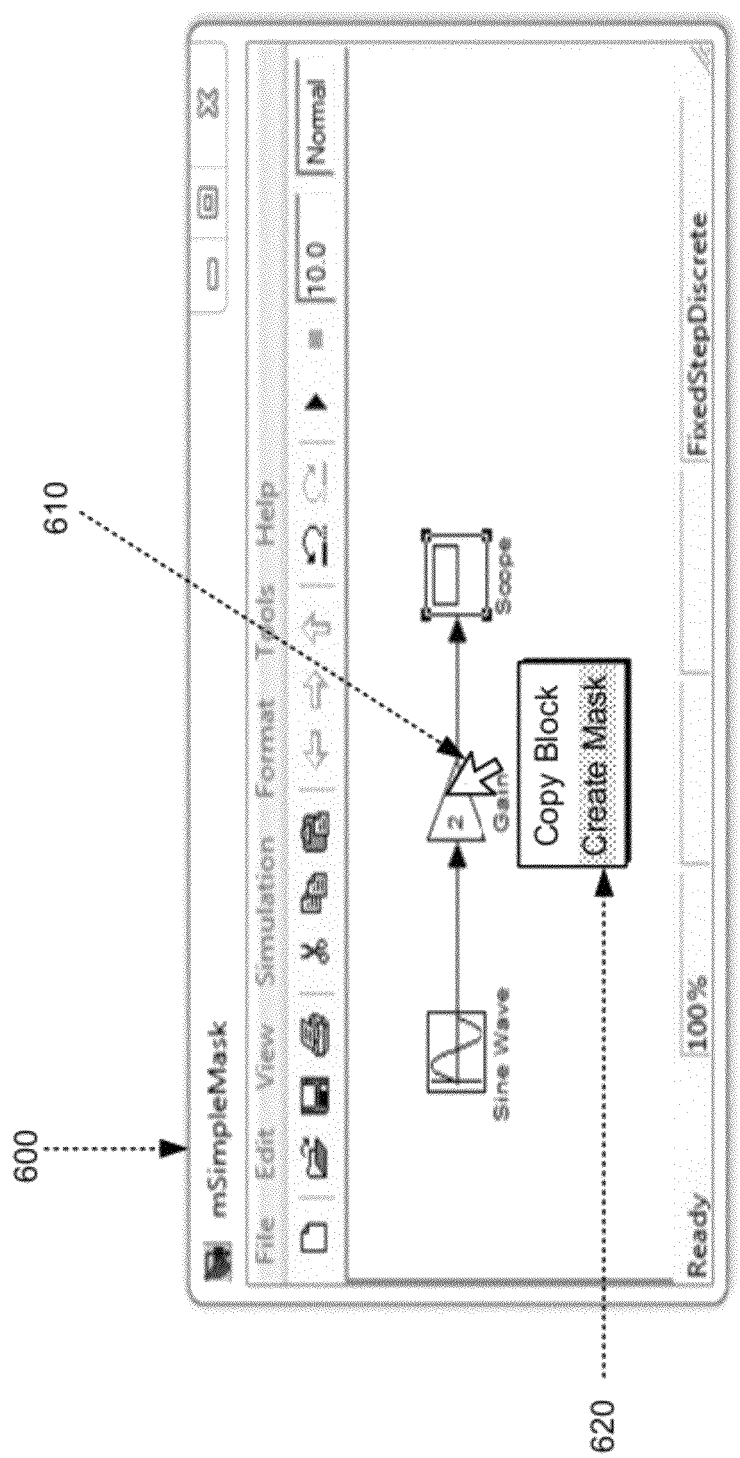
FIGS. 6-9D are diagrams that depict exemplary dialogs, block diagrams, and/or custom masked blocks associated with the process of FIG. 5.

FIG. 6 depicts a block diagram 600 from which a block author (not shown) has selected 610 a Gain block. Selection may include, for example, hovering a cursor over the block to be selected and clicking on the underlying block. A create mask selection may be received for the block, subsystem or multiple blocks selected in block 500 (block 510). FIG. 6 depicts window 620 displayed over block diagram 600 that permits the block author to select the option create mask from other permissible options. For example, the block author may right click on the Gain block to display window 620, move the cursor to hover over the create mask option, and then left click to select the create mask option from window 620.

Figure 7:
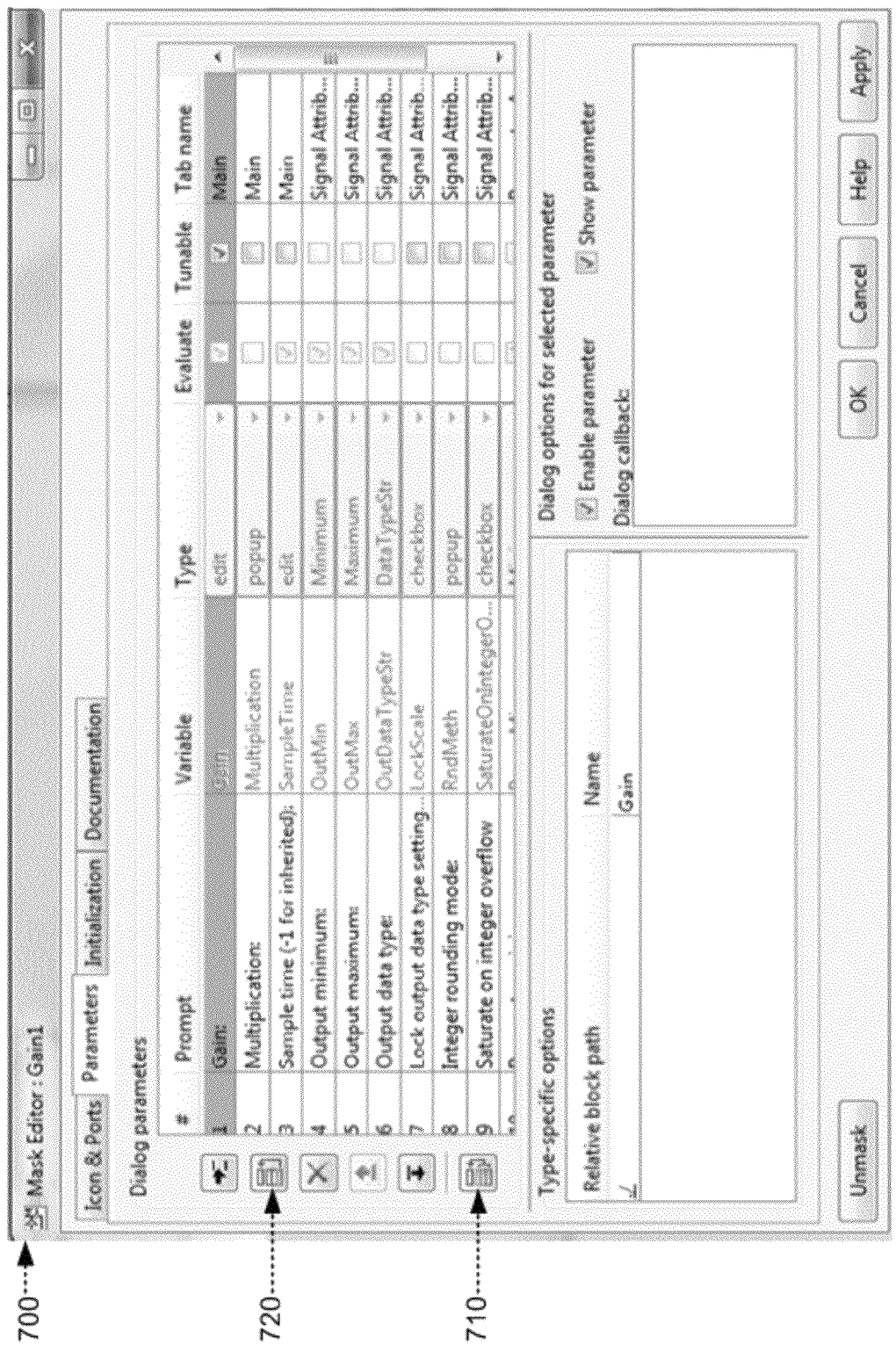

A mask editor dialog may be presented (block 520) and a parameter promotion selection may be received from the mask editor (block 530). The mask editor dialog may permit block author 105 to promote all built-in block parameters to the mask in a single click. The mask editor dialog may also permit block author 105 to promote selected block parameters to the mask. FIG. 7 depicts a mask editor 700 that may be presented to block author 105 in response to selection of the create mask option in block 510. Block author 105 may select a button 710 that promotes all of the built-in block parameters to the mask. Block author 105 may alternatively select a button 720 that permits the promotion of selected parameters to the mask via a promoted parameter selector dialog.

Figure 8:
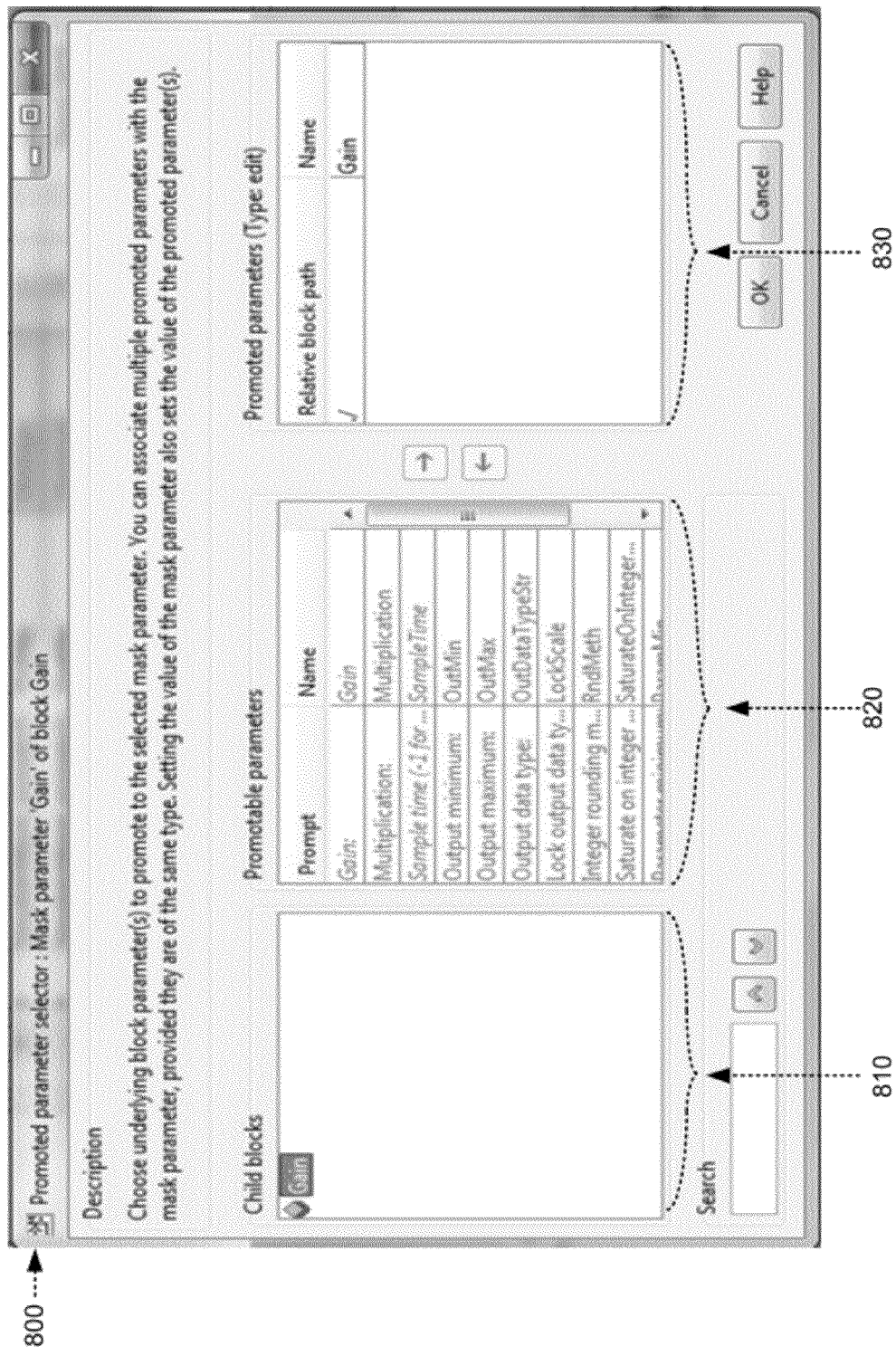
Figure 9A:
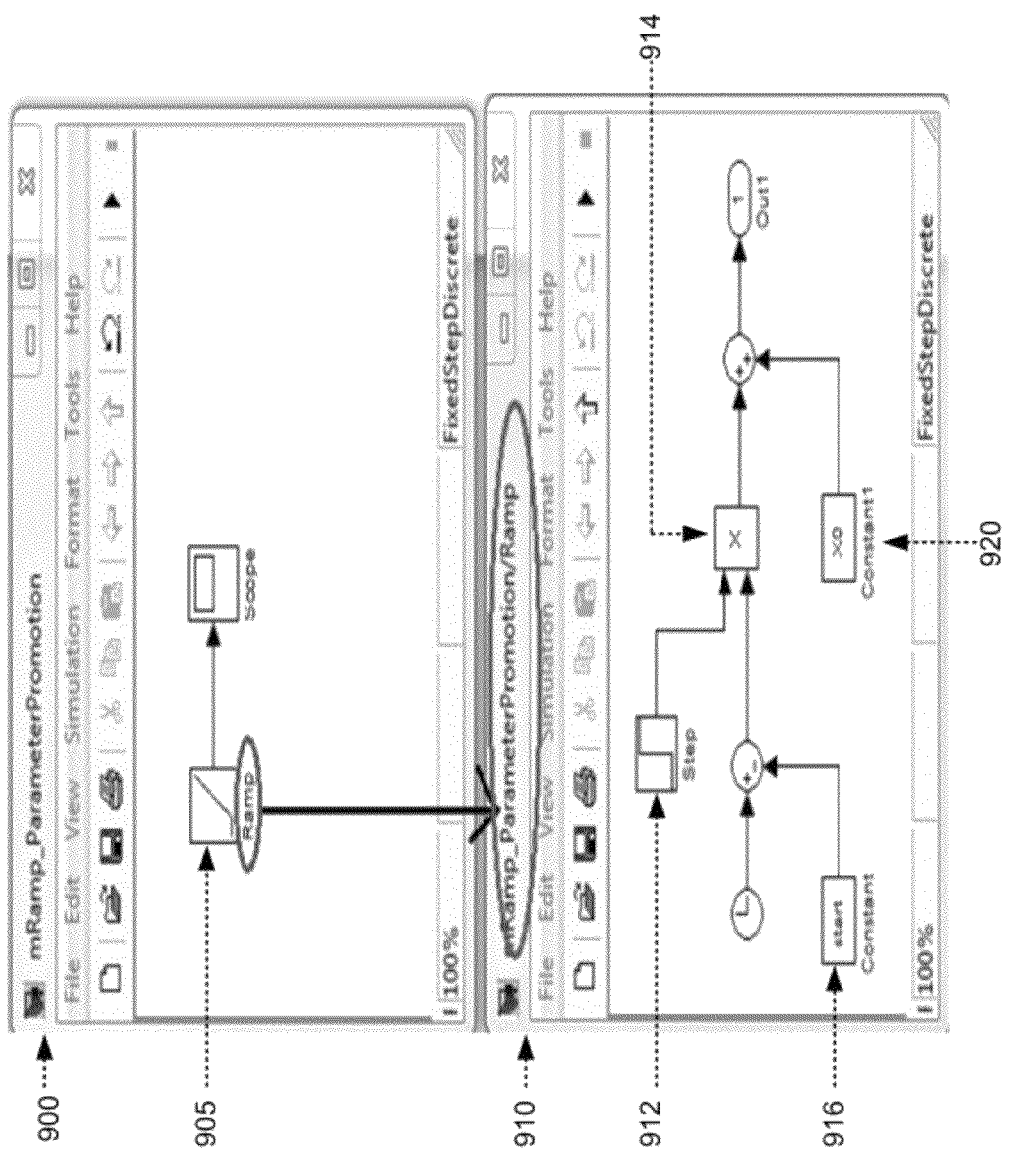
Figure 9B:
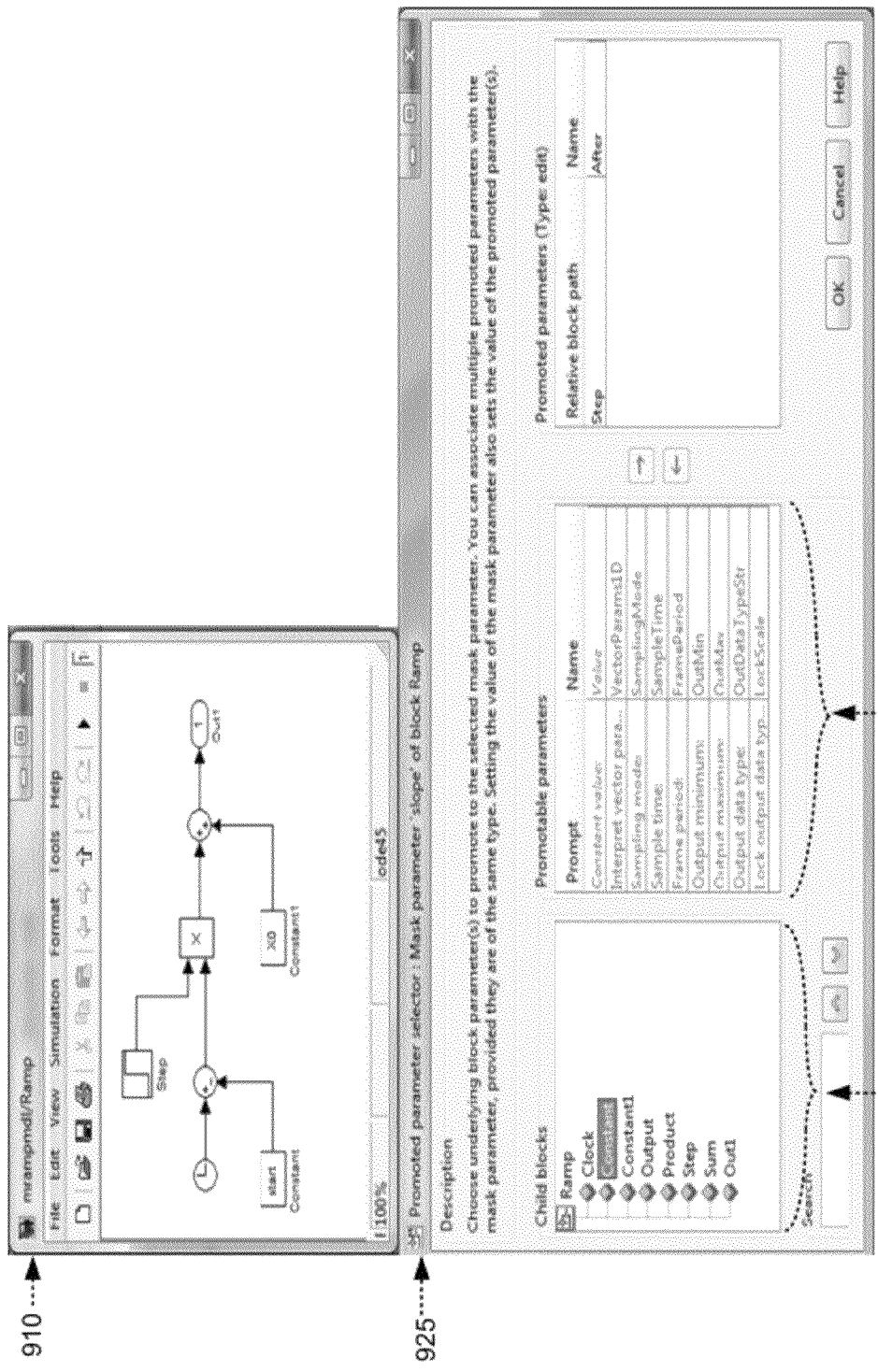

A parameter promotion selection dialog may be presented (block 540) and selection of parameters for promotion may be received via the parameter promotion dialog (block 550). FIG. 8 depicts a promoted parameter selector dialog 800 presented to block author 105 in response to selection of button 720 from mask editor 700. Promoted parameter selector dialog 800 permits block author 105 to select one or more blocks, and their associated parameters, for promotion to the mask. For example, as shown in FIG. 8, promoted parameter selector 800 may include a block field 810 that displays a list of blocks that may be selected for promotion to the mask. In the example of FIG. 8, only a single block (e.g., Gain) has been selected for promotion to the mask. Promoted parameter selector 800 may further include a promotable parameters field 820 that displays a list of parameters for the block selected in field 810. Block author 105 may select one or more parameters from field 820 for promotion to the mask. Promoted parameter selector 800 may further include a promoted parameters field 830 that displays a list of parameters promoted to the mask by block author 105 from list 820. FIG. 9A depicts another example in which a block diagram 900 includes a subsystem block 905 having multiple child blocks. FIG. 9A depicts a second block diagram 910 that includes the multiple child blocks 912, 914, 916 and 920 of subsystem block 905. As further shown in FIG. 9B, Block author 105 may select multiple child blocks from child blocks field 927 of a promoted parameter selector dialog 925, and then may further select one or more parameters for promotion from promotable parameters field 930 of promoted parameter selector dialog 925 for each selected child block. Therefore, multiple promoted parameters of child blocks of a subsystem may be controlled via a single custom masked block. In some implementations, the block author may add custom information to the custom masked block (e.g., company notes, custom parameters, etc.).

Figure 9C:
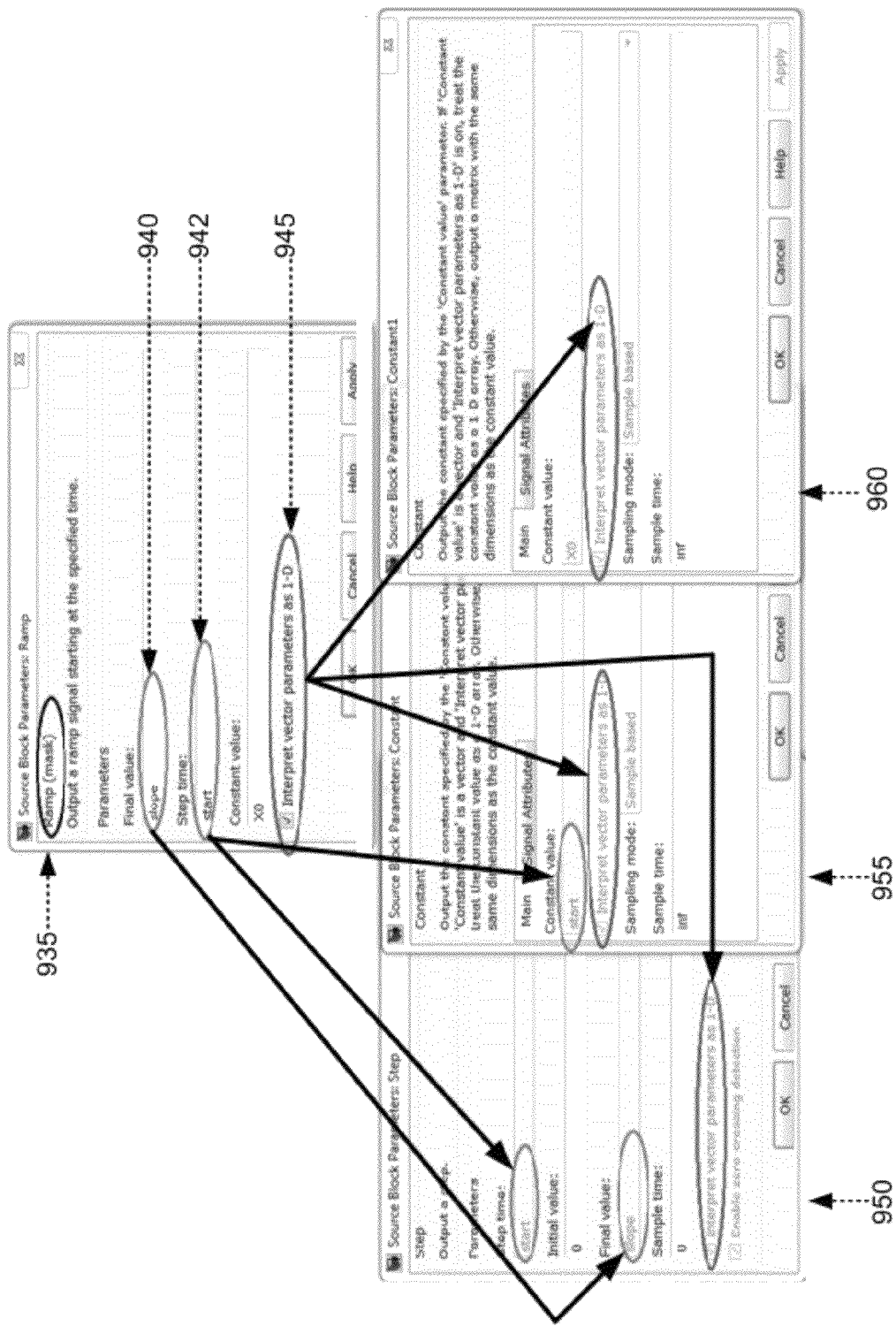

FIG. 9C depicts a custom masked block dialog 935 for subsystem block 905 with promoted mask parameters 940, 942 and 945. The values of promoted mask parameters 940, 942 and 945 specified by block author 105 or block user 145 may be automatically applied to the child blocks of subsystem block 905 (e.g., child blocks 912, 916 and 920), selected using child blocks field 927 of promoted parameter selector dialog 925. FIG. 9C further shows child dialog 950 for child block 912 having values for promoted mask parameters 940, 942 and 945 from custom masked block dialog 935. FIG. 9C also depicts child dialog 955 for child block 916 having values for promoted mask parameters 942 and 945 from custom masked block dialog 935. FIG. 9C additionally shows child dialog 960 for child block 920 having a value for promoted mask parameter 945 from customer masked block dialog 935.

Figure 9D:
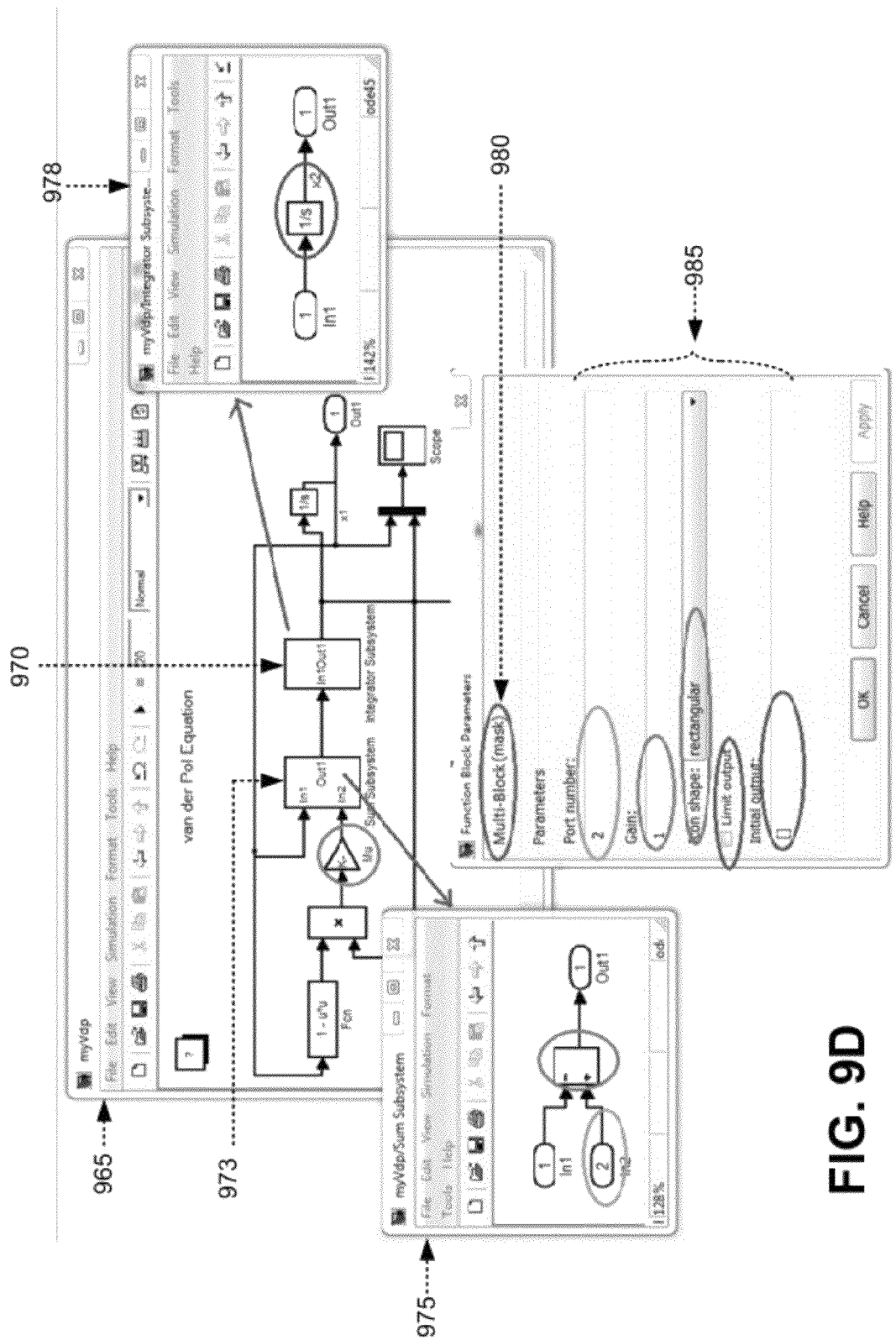

FIG. 9D depicts an example of the selection of multiple selected blocks for parameter promotion from a larger model having many blocks to create a multi-block mask that promotes block parameters of the selected multiple blocks. As shown, blocks 970 and 973 may be selected from block diagram 965. Upon selection of blocks 970 and 973, certain parameters (shown as circled in FIG. 9D) may be selected from block diagram 975 (for block 973) and block diagram 978 (for block 970) for promotion to a multi-block custom masked block 980. As shown in FIG. 9D, custom masked block 980 may include the multiple parameters 985 promoted from block diagrams 975 and 978 for blocks 973 and 970. Thereafter, setting of the values of parameters of multi-block customer masked block 980 automatically sets the corresponding parameters of blocks 937 and 970.

A custom masked block may be generated based on the promoted parameters (block 560). The custom masked block may specify the parameters of the underlying built-in block or blocks that have been selected for promotion. The promoted parameters may represent the parameters of the custom masked block that may be exposed to block user 145 for editing of the parameter values. The generated custom masked block may be stored in a block library (block 570). Upon completion of parameter promotion selection, and generation of the custom masked block, the custom masked block may be stored in block library 140 for future retrieval by block user 145.

Exemplary Block User Custom Masked Block Use Process

Figure 10:
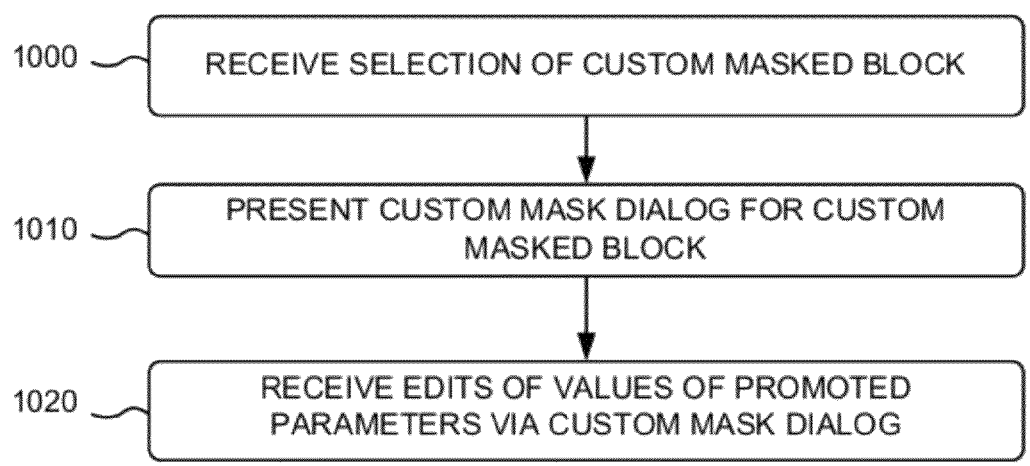
FIG. 10 is a flowchart of an exemplary process for retrieving a custom masked block from a block library and for using the custom masked block in a modeling block diagram.

FIG. 10 is a flowchart of an exemplary process for retrieving a custom masked block from block library 140 and for using the custom masked block in a block diagram. The exemplary process of FIG. 10 may be implemented by processing unit 315 of server 220 or client 210.

Figure 11:
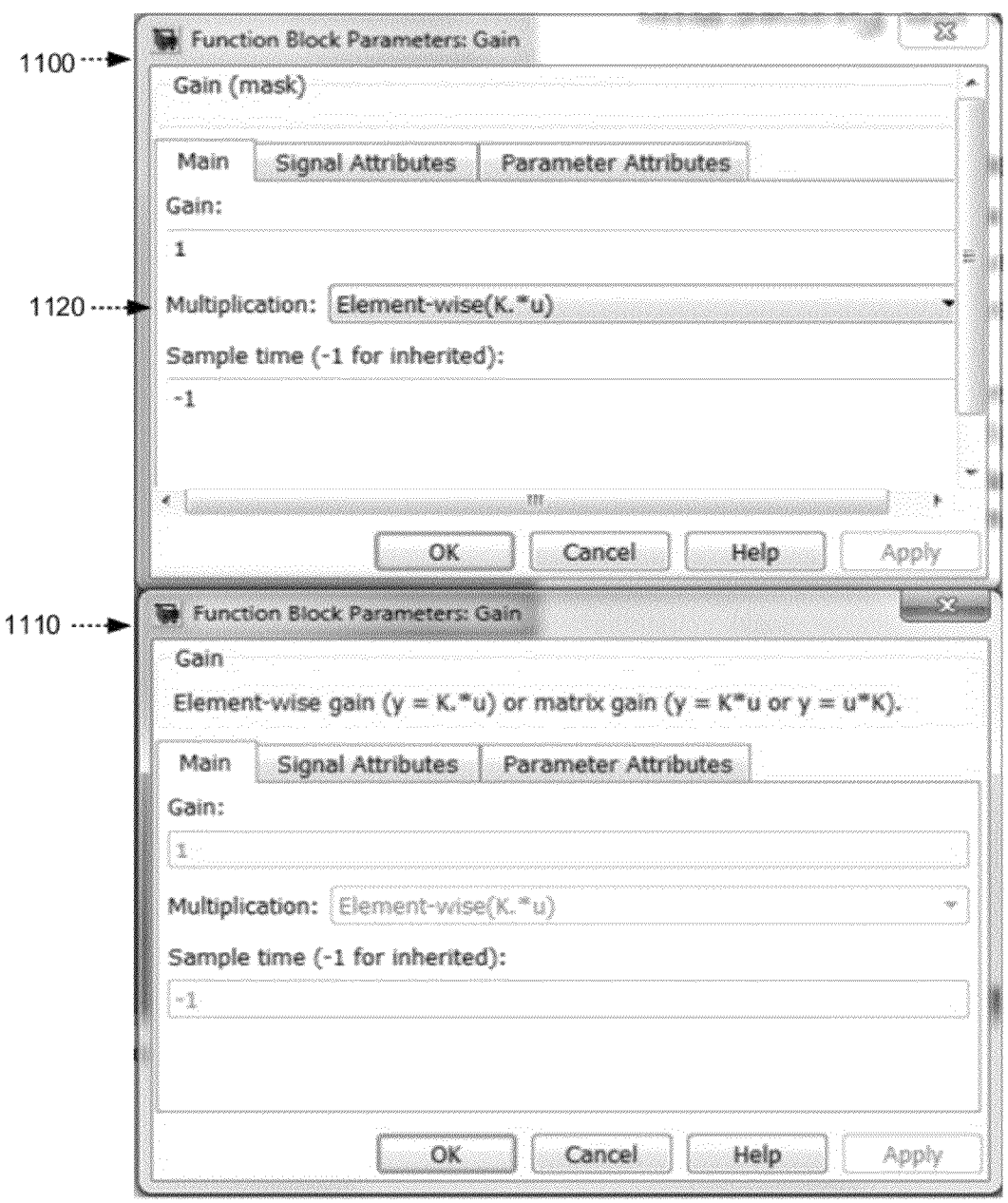
FIG. 11 is a diagram that depicts an exemplary custom masked dialog associated with the process of FIG. 10.

The exemplary process may include receiving selection of a custom masked block (block 1000). Block user 145, at, for example, client 210, may select a custom masked block, previously generated by library block author 105, from storage in block library 140. A custom mask dialog for the custom masked block may be presented (block 1010). The custom mask dialog may expose only the promoted parameters of the selected custom masked block for editing of their values by block user 145 (i.e., disallowing edits of values of other parameters of the custom masked block). Values of other parameters of the custom masked block may not be edited by block user 145. FIG. 11 depicts a custom mask dialog 1100 for a Gain block, and a typical dialog 1110 for a built-in Gain block. Edits of values of promoted parameters may be received via the custom mask dialog (block 1020). As shown in FIG. 11, the block user may only edit values for a promoted parameter via custom mask dialog 1100 (e.g., values for the multiplication parameter in custom mask dialog 1100 shown in FIG. 11. The custom masked block, with values edited by block user 145, may subsequently be used in a block diagram modeling environment to model a system or subsystem.

Conclusion

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 10, the order of the blocks may be varied in other implementations. Moreover, non-dependent blocks may be performed in parallel. Embodiments have been described herein as selecting block parameters from lists in a dialog for promotion to a mask. In other embodiments, however, the block author may drag and drop parameter widgets to a layout editor to promote the parameters for a custom masked block and a custom mask dialog.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software. Logic for practicing aspects described herein may be provided to a client via a license. This license may, in some implementations, be tiered so that users have varying degrees of flexibility and/or speed based on the licenses that they have.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
   one or more processors to:
   provide, via a user interface, information that identifies a plurality of blocks included in a block diagram model;
   receive a selection of one or more blocks of the plurality of blocks;
   provide, via the user interface, information that identifies a plurality of parameters that control a behavior of the selected one or more blocks;
   receive a selection of one or more parameters of the plurality of parameters;
   create a dialog box that includes the selected one or more parameters,
   the dialog box permitting editing of values associated with the selected one or more parameters,
   the dialog box not permitting editing of values associated with parameters other than the selected one or more parameters;
   generate a masked block, associated with the dialog box, based on the selected one or more parameters; and
   provide the masked block for display.

2. The device of claim 1, where the one or more blocks include multiple blocks;

where the one or more parameters include multiple parameters; and
where the multiple parameters control behaviors of different blocks included in the multiple blocks.

3. The device of claim 2, where the one or more processors are further to:
determine that the multiple parameters satisfy a rule for being associated with the masked block; and
where the one or more processors, when generating the masked block, are further to:
generate the masked block based on determining that the multiple parameters satisfy the rule.

4. The device of claim 1, where the one or more processors are further to:
receive, via the dialog box, input that identifies a parameter value associated with at least one parameter of the one or more parameters; and
execute the block diagram model using the parameter value.

5. The device of claim 1, where the one or more processors are further to:
prevent editing of values associated with the selected one or more parameters other than via the dialog box.

6. The device of claim 1, where the one or more processors, when providing the masked block for display, are further to:
replace, in the block diagram model, the one or more blocks with the masked block.

7. The device of claim 6, where the one or more processors are further to:
detect, via the block diagram model, an interaction with the masked block;
provide the dialog box based on detecting the interaction with the masked block;
receive, via the dialog box, input specifying a first value for a first parameter, of the selected one or more parameters, associated with a first block, of the one or more blocks;
receive, via the dialog box, input specifying a second value for a second parameter, of the selected one or more parameters, associated with a second block, of the one or more blocks,
the second block being different from the first block; and
execute the block diagram model based on the first value and the second value.

8. The device of claim 1, where the one or more processors are further to:
store the masked block in a block library.

9. The device of claim 1, where the one or more processors are further to:
provide, via the user interface, a first input mechanism for providing all of the plurality of parameters in the dialog box;
provide, via the user interface, a second input mechanism for providing less than all of the plurality of parameters in the dialog box; and
where the one or more processors, when creating the dialog box, are further to:
provide all of the plurality of parameters in the dialog box based on detecting an interaction with the first input mechanism, or
provide less than all of the plurality of parameters in the dialog box based on detecting an interaction with the second input mechanism.

10. The device of claim 1, where the one or more processors are further to:
provide, via the user interface, information that identifies the selected one or more parameters.

11. A computer-readable medium storing instructions, the instructions comprising:
one or more instructions that, when executed by one or more processors, cause the one or more processors to:
provide information that identifies multiple blocks associated with a block diagram model;
receive a selection of one or more blocks of the multiple blocks;
provide information that identifies multiple parameters that control a behavior, in the block diagram model, of the selected one or more blocks;
receive a selection of one or more parameters of the multiple parameters;
create a user interface that provides information that identifies the selected one or more parameters,
the user interface permitting input of values associated with the selected one or more parameters, and
the user interface not permitting input of values associated with parameters other than the selected one or more parameters;
generate a masked block, associated with the user interface, based on the selected one or more parameters; and
provide the masked block in the block diagram model.

12. The computer-readable medium of claim 11, where the one or more parameters include a plurality of parameters that control behaviors of different blocks included in the multiple blocks.

13. The computer-readable medium of claim 11, where the one or more instructions, when executed by the one or more processors, further cause the one or more processors to:
receive, via the user interface, input that identifies a parameter value associated with at least one parameter of the one or more parameters; and
execute the block diagram model based on the parameter value.

14. The computer-readable medium of claim 11, where the one or more instructions, when executed by the one or more processors, further cause the one or more processors to:
replace, in the block diagram model, the one or more blocks with the masked block.

15. The computer-readable medium of claim 11, where the one or more instructions, when executed by the one or more processors, further cause the one or more processors to:
detect an interaction with the masked block;
provide the user interface, for display, based on detecting the interaction with the masked block;
receive, via the user interface, first input specifying a first value for a first parameter, of the one or more parameters, associated with a first block, of the one or more blocks;
receive, via the user interface, second input specifying a second value for a second parameter, of the one or more parameters, associated with a second block, of the one or more blocks,
the second block being different from the first block; and
execute the block diagram model using the first value and the second value.

16. The computer-readable medium of claim 11, where the one or more instructions, when executed by the one or more processors, further cause the one or more processors to:
store the masked block in a block library.

17. The computer-readable medium of claim 11, where the one or more instructions, when executed by the one or more processors, further cause the one or more processors to:
provide a first input mechanism for providing all of the multiple parameters in the user interface;

provide a second input mechanism for providing a portion of the multiple parameters in the user interface,
the portion of the multiple parameters being less than all of the multiple parameters; and
where the one or more instructions, that cause the one or more processors to create the user interface, further cause the one or more processors to:
create the user interface that permits input of values associated with all of the multiple parameters based on detecting an interaction with the first input mechanism, or
create the user interface that permits input of values associated with a portion of the multiple parameters based on detecting an interaction with the second input mechanism.

18. The computer-readable medium of claim 11, where the one or more instructions, when executed by the one or more processors, further cause the one or more processors to:
provide, for display, information that identifies the selected one or more parameters.

19. A method, comprising:
providing, via a user interface, first information that identifies a plurality of blocks included as elements of a block diagram model,
the providing the first information being performed by one or more devices;
receiving a first input that identifies one or more blocks of the plurality of blocks,
the receiving the first input being performed by the one or more devices;
providing, via the user interface, second information that identifies a plurality of parameters that control one or more behaviors of the one or more blocks,
the providing the second information being performed by the one or more devices;
receiving a second input that identifies one or more parameters of the plurality of parameters,
the receiving the second input being performed by the one or more devices; and
creating a dialog box based on the one or more parameters,
the dialog box permitting input of values associated with the one or more parameters,
the dialog box not permitting input of values associated with parameters other than the one or more parameters,
the creating the dialog box being performed by the one or more devices;
generating a masked block, associated with the dialog box, based on the one or more parameters,
the generating the masked block being performed by the one or more devices; and
providing the masked block for display,
the providing the masked block being performed by the one or more devices.

20. The method of claim 19, where the one or more blocks include multiple blocks;
where the one or more parameters include multiple parameters; and
where the multiple parameters control one or more behaviors of different blocks included in the multiple blocks.

21. The method of claim 20, further comprising:
determining that the multiple parameters satisfy a rule for being associated with the masked block; and
where generating the masked block further comprises:
generating the masked block based on determining that the multiple parameters satisfy the rule.

22. The method of claim 19, further comprising:
receiving, via the dialog box, input that identifies a parameter value associated with a parameter, of the one or more parameters, of a block of the one or more blocks; and
executing the block diagram model using the parameter value for the block.

23. The method of claim 19, further comprising:
preventing input of a value associated with the one or more parameters other than via the dialog box.

24. The method of claim 19, where providing the masked block for display further comprises:
replacing, in the block diagram model, the one or more blocks with the masked block.

25. The method of claim 24, further comprising:
detecting an interaction with the masked block;
providing the dialog box based on detecting the interaction with the masked block;
receiving, via the dialog box, input specifying a first value for a first parameter, of the one or more parameters, associated with a first block, of the one or more blocks;
receiving, via the dialog box, input specifying a second value for a second parameter, of the one or more parameters, associated with a second block, of the one or more blocks,
the second block being different from the first block; and
executing the block diagram model using the first value for the first block and the second value for the second block.

26. The method of claim 19, further comprising:
storing the masked block in a block library.

27. The method of claim 19, further comprising:
providing, via the user interface, a first input mechanism for identifying all of the plurality of parameters;
providing, via the user interface, a second input mechanism for identifying less than all of the plurality of parameters; and
where creating the dialog box further comprises:
creating the dialog box based on detecting an interaction with the first input mechanism or the second input mechanism.

28. The method of claim 19, further comprising:
providing, via the user interface, information that identifies the one or more parameters as being identified for inclusion in the dialog box.

* * * * *